US012563350B2

(12) United States Patent
Karrer et al.

(10) Patent No.: US 12,563,350 B2
(45) Date of Patent: Feb. 24, 2026

(54) METHOD OF AUDIO SIGNAL PROCESSING, HEARING SYSTEM AND HEARING DEVICE

(71) Applicant: Sonova AG, Stäfa (CH)

(72) Inventors: Rafael Karrer, Staefa (CH); Arnaud Brielmann, Le Landeron (CH); Jan Brunner, Staefa (CH); Stina Wargert, Uetikon am See (CH)

(73) Assignee: Sonova AG, Stäfa (CH)

( * ) Notice: Subject to any disclaimer, the term of this patent is extended or adjusted under 35 U.S.C. 154(b) by 183 days.

(21) Appl. No.: 18/364,118

(22) Filed: Aug. 2, 2023

(65) Prior Publication Data

US 2024/0064475 A1 Feb. 22, 2024

(30) Foreign Application Priority Data

Aug. 19, 2022 (EP) .................................... 22191234

(51) Int. Cl.
*H04R 25/00* (2006.01)

(52) U.S. Cl.
CPC ......... *H04R 25/407* (2013.01); *H04R 25/405* (2013.01); *H04R 25/505* (2013.01)

(58) Field of Classification Search
CPC ................ H04R 25/407; H04R 25/405; H04R 25/505; H04R 2410/01; H04R 2430/20; H04R 25/552; H04R 25/43
See application file for complete search history.

(56) References Cited

U.S. PATENT DOCUMENTS

| | | | |
|---|---|---|---|
| 2010/0135500 A1 | 6/2010 | Derleth et al. |
| 2019/0182607 A1 | 6/2019 | Pedersen et al. |
| 2019/0364370 A1 | 11/2019 | Riis et al. |
| 2021/0136501 A1 | 5/2021 | Ma et al. |

OTHER PUBLICATIONS

Search Report issued in European U.S. Appl. No. 22/191,234 dated Feb. 7, 2023.

*Primary Examiner* — Tuan D Nguyen
(74) *Attorney, Agent, or Firm* — McDonald Hopkins LLC

(57) ABSTRACT

A method of audio signal processing, a hearing system and a hearing device. A primary input audio signal is obtained using an audio input unit of a hearing device. A secondary input audio signal is obtained using a second device of the hearing system. The secondary input audio signal is transmitted from the second device to the hearing device. A level feature is determined based on the primary and secondary input audio signals using a feature estimation unit of the hearing device. An output audio signal is obtained by an audio processing unit, wherein the level feature is used for steering at least one audio processing routine of the audio processing unit. The output audio signal is outputted by an audio output unit of the hearing device.

13 Claims, 6 Drawing Sheets

METHOD OF AUDIO SIGNAL PROCESSING, HEARING SYSTEM AND HEARING DEVICE

The present inventive technology concerns a method of audio signal processing on a hearing system, in particular a method of binaural audio signal processing on a hearing system. The inventive technology further relates to a hearing system, in particular a hearing system comprising two hearing devices. The inventive technology further relates to a hearing device.

BACKGROUND

Hearing systems and audio signal processing thereon are known from the prior art. In modern hearing devices, the audio signal processing may be adapted to properties of audio signals to be processed by one or more hearing devices.

SUMMARY

It is an object of the present inventive technology to improve audio signal processing on a hearing system, in particular to provide a method of audio signal processing which allows for stable and reliable audio signal processing also in difficult, in particular asymmetric, acoustic scenes.

This object is achieved by the method as claimed. The method concerns audio signal processing on a hearing system. The hearing system comprises a first device being a hearing device and a second device. The method comprises the steps of obtaining a primary input audio signal by an audio input unit of the first device, obtaining a secondary input audio signal using the second device, transmitting the secondary input audio signal from the second device to the first device, determining a level feature based on the primary input audio signal and the secondary input audio signal by a feature determination unit of the first device, obtaining the output audio signal from the primary input audio signal and/or secondary input audio signal by applying at least one audio processing routine using an audio processing unit of the first device, wherein the level feature is used for steering the at least one audio processing routine, and outputting the output audio signal by an audio output unit of the first device.

The method allows to adapt the audio signal processing to the acoustic scene by steering the at least one audio processing routine. Determining the level feature based on the primary input audio signal and the secondary input audio signal has the advantage that additional acoustic information, which may not or not fully be contained in the primary input audio signal, can be taken into account when steering the at least one audio processing routine. In particular, the secondary input audio signal may be obtained by the second device at a different position than that of the first device. Particularly advantageous, acoustic information, which is specific to the primary input audio signal, may not lead to steering of the at least one audio processing routine, which is inconsistent with the actual acoustic scene. For example, the hearing devices may be worn or implanted at one ear of a hearing system user. In asymmetric acoustic scenes, for example if a sound source is positioned to the side of the user, acoustic effects, like head shadowing, may influence the primary input audio signal obtained by the first device being a hearing device. In particular in such asymmetric acoustic scenes, sounds of an asymmetrically positioned sound source may be overrepresented or underrepresented in the primary input audio signal, leading to overestimation or underestimation of the respective level features in the steering of the audio processing routine. In other words, steering based on the primary input audio signal alone may lead to an asymmetry or instability of the audio signal processing, which does not correctly reflect the actual acoustic environment. This is particularly relevant for hearing systems comprising two hearing devices to be worn at the left and right ear of the user. Such hearing systems are prone to inconsistent steering of the audio signal processing on the different hearing devices in asymmetric acoustic scenes, e.g. because one of the hearing devices overestimates a sound source's impact while the other hearing device underestimates the sound source's impact on the acoustic scene. Determining the level feature, which is used for steering the at least one audio processing routine, based on the primary input audio signal and the secondary input audio signal increases the information content in in the level feature, thereby improving the steering of the at least one audio processing routine, in particular avoiding inconsistent or asymmetric steering.

A further advantage of the method lies in the determination of the level feature based on the primary input audio signal and the secondary input audio signal directly on the first device itself. The transmittal of respective further data, in particular of a secondary level feature, from the second device to the first device is not necessary. It is sufficient to transmit a secondary input audio signal, which, in many use cases, may be anyway transmitted to the first device, for example for binaural processing. The method such reduces the load on a wireless data connection between the first device and the second device, in particular between different hearing devices of a hearing system.

Here and in the following, the term "acoustic environment" is to be understood as an acoustic environment, which the user of the hearing system encounters. The acoustic environment may also be referred to as ambient sound.

The first device is a hearing device. Here and in the following, the first device may, for simplicity, also be referred to as first hearing device. The first device comprises the audio input unit, the feature determination unit for determining the level feature, the audio processing unit for audio signal processing to obtain the output audio signal using the at least one audio processing routine, and the audio output unit. The first device is configured for receiving the secondary input audio signal transmitted by the second device.

The second device is configured for obtaining and transmitting a secondary input audio signal.

A hearing device as in the context of the present inventive technology may be a wearable hearing device, in particular a wearable hearing aid, or an implantable hearing device, in particular an implantable hearing aid, or a hearing device with implants, in particular a hearing aid with implants. An implantable hearing aid is, for example, a middle-ear implant, a cochlear implant or brainstem implant. A wearable hearing device is, for example, a behind-the-ear device, an in-the-ear device, a spectacle hearing device or a bone conduction hearing device. In particular, the wearable hearing device can be a behind-the-ear hearing aid, an in-the-ear hearing aid, a spectacle hearing aid or a bone conduction hearing aid. A wearable hearing device can also be a suitable headphone, for example what is known as a hearable or smart headphone.

A hearing system in the sense of the present inventive technology is a system of one or more devices being used by a user, in particular by a hearing-impaired user, for enhancing his or her hearing experience. A hearing system can comprise one or more hearing devices. For example, a hearing system can comprise two hearing devices, in particular two hearing aids. The hearing devices can be considered to be wearable or implantable hearing devices associated with the left and right ear of a user, respectively.

Particular suitable hearing systems can further comprise one or more peripheral devices. A peripheral device in the sense of the inventive technology is a device of the hearing system, which is not a hearing device, in particular not a hearing aid. In particular, one or more peripheral devices may comprise a mobile device, in particular a smartwatch, a tablet and/or a smartphone. The peripheral device may be realized by components of the respective mobile device, in particular the respective smartwatch, tablet and/or smartphone. Particularly preferably, the standard hardware components of the mobile device are used for this purpose by virtue of an applicable piece of hearing system software, for example in the form of an app, being installable and executable on the mobile device. Additionally or alternatively, the one or more peripheral devices may comprise a wireless microphone. Wireless microphones are assistive listening devices used by hearing impaired persons to improve understanding of speech in noise and over distance. Such wireless microphones include, for example, body-worn microphones or table microphones.

Different devices of the hearing system, in particular different hearing devices and/or peripheral devices, may be connectable in a data-transmitting manner, in particular by a wireless data connection. In particular, the second device and the first device may be connectable in a data-transmitting manner for transmitting the secondary input audio signal. The wireless data connection can be provided by a global wireless data connection network to which devices of the hearing system can connect or can be provided by a local wireless data connection network which is established within the scope of the hearing system. The local wireless data connection network can be connected to a global data connection network as the Internet e.g. via a landline or it can be entirely independent. A suitable wireless data connection may be a Bluetooth connection or similar protocols, such as for example Asha Bluetooth. Further exemplary wireless data connection are DM (digital modulation) transmitters, aptX LL and/or induction transmitters (NFMI). The wireless data connection may comprise any proprietary connection technology. Also other wireless data connection technologies, e.g. broadband cellular networks, in particular 5G broadband cellular networks, and/or WIFI wireless network protocols, can be used.

The first device, the second device and/or a peripheral device of a hearing system may be connectable to a remote device. The term "remote device" is to be understood as any device which is not a part of the hearing system. In particular, the remote device is positioned at a different location than the hearing system. The remote device may preferable be connectable to a hearing device, in particular the first hearing device, the second device and/or a peripheral device via a data connection, in particular via a remote data connection. The remote device, in particular the remote server, may in particular be connectable to a hearing device by a peripheral device of the hearing system, in particular in form of a smartwatch, a smartphone and/or a tablet. The data connection between the remote device, in particular the remote server, and the hearing device may be established by any suitable data connection, in particular by a wireless data connection such as the wireless data connection described above with respect to the devices of the hearing system. The data connection may in particular be established via the Internet.

The second device is to be understood as being separate from the first device. The second device may be connectable to the first device via a data connection, in particular via a wireless data connection. The second device advantageously obtains the secondary input audio signal at a different position than the first device. The combination of primary input audio signal and secondary input audio signal, on which the determination of the level feature is based, preferably carries spatial information.

The second device may be a peripheral device of the hearing system. For example, the second device may be a mobile device, such as a smartphone. In particular, the second device may be wireless microphone obtaining the secondary input audio signal from the ambient sound.

Preferably, the second device may be a hearing device, in particular hearing aid, of the hearing system, in particular a wearable or implantable hearing device, which is associated with the other ear of a hearing system user than the first device. In such embodiments, the second device may also be referred to as second hearing device. Using a second hearing device as second device is particularly advantageous with respect to consistent and symmetric audio signal processing in the hearing system, in particular on both hearing devices. Relevant acoustic effects, like head shadowing, can reliably be avoided in the steering of the at least one audio processing routine.

The terms "second" as used in the present context, e.g. by way of "second device", is not to be understood in that the respective device per se is subordinate and/or auxiliary to the first device. In contrast, the second device may also be another hearing aid of the hearing system. In the present context, the term "second" is mainly used to reliably distinguish between the first device, its components and audio signals and those of the second device.

The terms "secondary" as used in the present context, e.g. by way of "secondary input audio signal" or "secondary level feature", is not to be understood in that the respective audio signal per se is subordinate and/or auxiliary to further audio signals. In the present context, the terms "primary" and "secondary" are mainly used to reliably distinguish between the audio signals, components and other data obtained by or belonging to the first device and those of the second device. When seen from the perspective of the first device and the audio processing on the first device, the term "secondary" merely reflects the fact that the secondary input audio signal is obtained and provided from another device, which is separate from the first device.

Particularly preferable, the second device is a hearing device, in particular hearing aid, of the hearing system. In this regard, both hearing devices advantageously may process audio signals in a corresponding way. In this regard, each hearing device may be seen as a second device for the respective other hearing device. In such setups, when describing the audio signal processing on one of the hearing devices, the respective hearing device may be referred to as "ipsi side" or "ipsi hearing device". The respective other hearing device may be referred to as "contra side" or "contra hearing device". Equivalently, (input) audio signals, data and/or other components, which belong to or are associated with one of the hearing devices, may be indicated with the terms "ipsi" or "contra". In such setups, the first hearing device may be referred to as "ipsi hearing device", while the second hearing device may be referred to as "contra hearing device".

In the present context, an audio signal, in particular an audio signal in form of the primary or secondary input audio signal and/or the output audio signal, may be any electrical signal, which carries acoustic information. In particular, an audio signal may comprise unprocessed or raw audio data, for example raw audio recordings or raw audio wave forms, and/or processed audio data, for example extracted audio features, compressed audio data, a spectrum, in particular a frequency spectrum, a cepstrum and/or cepstral coefficients and/or otherwise modified audio data. The audio signal can particularly be a signal representative of a sound detected locally at the user's position, e.g. generated by one or more electroacoustic transducers in the form of one or more microphones, in particular one or more electroacoustic transducers of an audio input unit of a hearing device, in particular the first hearing device. An audio signal may be in the form of an audio stream, in particular a continuous audio stream. For example, the audio input unit may obtain the input audio signal by receiving an audio stream provided to the audio input unit. For example, an input signal received by the audio input unit may be an unprocessed recording of ambient sound, e.g. in the form of an audio stream received wirelessly from a peripheral device and/or a remote device which may detect the sound at a remote position distant from the user. The audio signals in the context of the inventive technology can also have different characteristics, format and purposes. In particular, different kinds of audio signals, e.g. the primary input audio signal, the secondary input audio signal and/or the output audio signal, may differ in characteristics and/or metrics and/or format.

The audio signal processing of a hearing device, e.g. audio processing of the first device includes obtaining the output audio signal from the primary input audio signal and/or the secondary input audio signal. Obtaining the output audio signal from the primary input audio signal and/or the secondary input audio signal is in particular to be understood as modifying and/or synthesizing the primary input audio signal and/or the secondary input audio signal, in particular a combination of the primary input audio signal and the secondary input audio signal. The modification of the input audio signals may in particular comprise sound enhancement, which can comprise speech enhancement and/or noise cancellation, e.g. wind noise cancellation. Sound enhancement may in particular improve intelligibility or ability of a listener to hear a particular sound. For example, speech enhancement refers to improving the quality of speech in an audio signal so that the listener can better understand speech. The modification of the input audio signals may additionally or alternatively refer to beamforming, e.g. by a monaural beamformer and/or a binaural beamformer.

The audio signal processing applies at least one audio processing routine. Exemplary audio processing routine mays comprise traditional audio processing routines and/or machine learning based audio processing routines, e.g. neural networks, for audio signal processing. In the context of the present inventive technology, "traditional audio processing routines" are to be understood as audio processing routines which do not comprise methods of machine learning, in particular which do not comprise neural networks, but can, e.g. include digital audio processing. The at least one audio processing routine may in particular be provided in form of executable software which may be stored and executed on a hearing device, in particular the first hearing device. An audio processing routine may also be referred to as audio processing algorithm.

The at least one audio processing algorithm is steered by the determined level feature. It is also possible to use the level feature to steer two or more audio processing routines, which are applied in the audio signal processing to obtain the output audio signal. The audio processing routines may comprise any suitable audio processing routine, which may be steered by a level feature. It is possible to determine different level features based on the primary input audio signal and the secondary input audio signal. Different level features may be used to steer different audio processing routines.

The level feature may be used for directly steering the at least one audio processing routine. For example, the level feature may be used as a steering parameter which is inputted to the at least one audio processing routine. The at least one audio processing routine may adapt the audio signal processing in accordance with the inputted level feature. For example, the level feature may be used by an audio processing routine to determine a mixing ratio of two input audio signals, in particular of the primary input audio signal and the secondary input audio signal, in an output audio signal.

Alternatively or additionally, the level feature may be used for indirect steering of at least one audio processing routine. "Indirect steering" may be understood in that the level feature is not directly used as steering parameter, but, e.g., a suitable steering parameter may be determined based on the level feature. For example, the level feature may be used as input by a steering algorithm for calculating a steering parameter, which is then provided to the at least one audio processing routine. For example, the level feature may be inputted to a classifier for classifying one or more properties of the acoustic scene based on the level feature. For example, a level feature comprising a noise floor estimate and/or a sound pressure level, preferably with frequency resolution, may be used as input to a steering algorithm, in particular a classifier. The classification output may be used for steering the further audio signal processing. Using the level feature as input to a steering algorithm, in particular a classifier, has the particular advantage, that steering, in particular classification, is not impaired in asymmetric acoustic scenes. Particularly preferable, steering, in particular classification, is symmetric on both hearing devices of a binaural hearing system.

The term "level feature" is in particular to be understood as an estimator of one or more statistical properties in an audio signal. The level feature may comprise one or more approximations of a statistical property in the audio signal. The level feature may be a scalar quantity or vector-valued. For example, a vector-valued level feature may comprise an approximation of a statistical property with frequency resolution. The level feature may also be referred to as input level estimate. For example, the level feature may be determined by filtering a mean value, in particular the root-mean-square (RMS) value, of audio signals. Filtering may advantageously comprise different processing techniques, in particular different combinations of linear filters, non-linear averagers, threshold-based signal detection and decision logic. Particularly suitable level features may comprise a sound pressure level (SPL), a signal-to-noise-ratio (SNR), a noise floor estimate (NFE) and/or a low frequency level (LFL).

The level feature is determined based on the primary input audio signal and the secondary input signal. This is to be understood in that information retrieved from both the primary input audio signal and the secondary input signal are contained the level feature. At least parts of the primary input audio signal and parts of the secondary input audio signal are used for determining the level feature. For example, the primary input audio signal may be based on ambient sound received by two or more microphones of an input audio unit, in particular a front microphone and a rear microphone, of a hearing device, in particular the first hearing device. The level feature may be determined using the primary input audio signal as whole or only single components, e.g. parts of the primary input audio signal obtained by one or more of the microphones.

Determining the level feature based on the primary input audio signal and the secondary input audio signal may include combining at least parts of the primary input audio signal with at least parts of the secondary input audio signal. For example, the primary input audio signal and the secondary input audio signal mixed, in particular averaged. The level feature may then be determined from the combined input audio signal, in particular the averaged input audio signal. Preferably, respective primary and secondary level features may be determined independently from at least parts of the primary input audio signal and at least parts from the secondary input audio signal, respectively. For determining the level feature, the primary level feature and the secondary level feature may be combined, in particular averaged.

The primary input audio signal and the secondary input audio signal, in particular parts thereof, used for the determination of the level feature, may be of the same format, characteristic and/or metric. It is possible to use different formats, characteristics and/or metrics for the primary input audio signal and the secondary input audio signal. Preferably, the primary input audio signal may be in the form of raw audio data. For example, it is possible to use the omni input signal of the first hearing device as primary input audio signal for the determination of the level feature. The secondary input audio signal may comprise processed and/or compressed audio data. For example, the secondary input audio signal may be provided as a beamformed audio signal obtained by the second device. It is in particular possible to provide the secondary input audio signal with a reduced bandwidth to the first device. This way, data load may be reduced upon transmitting the secondary input audio signal.

An audio input unit in the present context is configured to obtain the input audio signal. Obtaining the input audio signal may comprise receiving an input signal by the audio input unit. For example, the input audio signal may correspond to an input signal received by the audio input unit. The audio input unit may for example be an interface for the incoming input signal, in particular for an incoming audio stream. The incoming audio stream may already have the correct format. The audio input unit may also be configured to convert an incoming audio stream into the input audio signal, e.g. by changing its format and/or by transformation, in particular by a suitable Fourier transformation. Obtaining the input audio signal may further comprise to provide, in particular to generate, the input audio signal based on the received input signal. For example, the received input signal can be an acoustic signal, i.e. a sound, which is converted into the input audio signal. For this purpose, the audio input unit may be formed by or comprise one or more electroacoustic transducers, e.g. one or more microphones. Preferably, the audio input unit may comprise two or more microphones, e.g. a front microphone and a rear microphone of a hearing device, in particular a front microphone and a rear microphone of a hearing aid. The received input signal can also be an audio signal, e.g. in the form of an audio stream, in which case the audio input unit is configured to provide the input audio signal based on the received audio stream. The received audio stream may be provided from another hearing device, a peripheral device and/or a remote device, e.g., a table microphone device, or any other remote device constituting a streaming source or a device connected to a streaming source, including but not limited to a mobile phone, laptop, or television.

The secondary input audio signal may be transmitted to the first device in a format, characteristic and/or metric outputted by an input audio unit of the second device. Additionally or alternatively, it is possible that the second device processes the secondary input audio signal before transmitting. For example, the secondary input audio signal may be beamformed. Additionally or alternatively, the secondary input audio signal may be reduced in bandwidth and/or compressed.

An audio output unit in the present context is configured to output the output audio signal. For example, the audio output unit may transfer or stream the output audio signal to another device, e.g. a peripheral device and/or a remote device. Outputting the output audio signal may comprise providing, in particular generating, an output signal based on an output audio signal. The output signal can be an output sound based on the output audio signal. In this case, the audio output unit may be formed by or comprise one or more electroacoustic transducers, in particular one or more speakers and/or so-called receivers. The output signal may also be an audio signal, e.g. in the form of an output audio stream and/or in the form of an electric output signal. An electric output signal may for example be used to drive an electrode of an implant for, e.g. directly stimulating neural pathways or nerves related to the hearing of a user.

The feature determination unit and the audio processing unit may be part of, in particular can be executed by, a common processing device of a hearing device, in particular the first device. In that sense, the feature determination unit and the audio processing unit may each be a functional unit, being part of a common computing device. For example, the feature determination unit and/or the audio processing unit may be provided in the form of an executable software, which is stored and executed on the hearing device, in particular by a processing device of the hearing device. It is also possible that the feature determination unit and the audio processing unit are part of, in particular are executed by, different respective processing devices of the hearing device. For example, respective processing devices may be specifically designed for the task of feature determination and/or audio processing.

A processing device in the present context, in particular one or more processing devices of the first device and/or the second device, may comprise a computing unit. The computing unit may comprise a general processor, adopted for performing arbitrary operations, e.g. a central processing unit (CPU). The processing device may alternatively or additionally comprise a processor specialized on the execution of a neural network, e.g. a neural network being comprised by an audio processing routine. Preferably, a processing device may comprise an AI chip for executing a neural network. However, a dedicated AI chip is not necessary for the execution of a neural network. Additionally or alternatively, the computing unit may comprise a multipurpose processor, an application-specific integrated circuit (ASIC), a field programmable gate array (FPGA), a digital signal processor, in particular being optimized for audio signal processing, and/or a multipurpose processor (MPP). The processing device may be configured to execute one or more audio processing routines stored on a data storage, in particular stored on a data storage of a hearing device, in particular the first device.

The processing device may further comprise a data storage, in particular in form of a computer-readable medium. The computer-readable medium may be a non-transitory computer-readable medium, in particular a data memory. Exemplar data memories include, but are not limited to, dynamic random access memories (DRAM), static random access memories (SRAM), random access memories (RAM), solid state drives (SSD), hard drives and/or flash drives.

According to a preferred aspect of the inventive technology, determining the level feature comprises determining a primary level feature based on the primary input audio signal, determining a secondary level feature based on the secondary input audio signal, and averaging the primary level feature and the secondary level feature to obtain the level feature. The independent determination of the primary level feature and the secondary level feature is particularly suitable if primary input audio signals and secondary input audio signals of different format, characteristic and/or metric are used. The determination of the level feature does not require a specific format with which the secondary input audio signal is transmitted. It is in particular possible to use a secondary input audio signal, which is anyway transmitted in the hearing system, e.g. for binaural audio signal processing on two hearing devices of the hearing system.

Averaging may comprise calculating the arithmetic mean or a weighted arithmetic mean of the primary and secondary level features. Using a weighted arithmetic mean has the advantage that, in some cases, one of the primary or secondary level features may have greater influence on the averaged level feature. In particular, it is possible to give more importance to the primary level feature.

In particular in case that the second device is a further hearing device of the hearing system, the primary level feature may also be referred to as ipsi level feature, while the secondary level feature may also be referred to as contra level feature.

According to a preferred aspect of the inventive technology, the second device is a further hearing device of the hearing system. This is particularly advantageous as the method does not rely on a peripheral device, which the user would have to carry additionally to the hearing devices. Further, the method is particularly suitable for binaural processing of audio signals on the hearing devices.

In particular, the second device may be a hearing device, which is associated with a respective other ear of the hearing system user than the first hearing device. Particularly advantageous, the second device is a hearing device, which is configured correspondingly to the first hearing device. The second device being a hearing device may in particular comprise an input audio unit, a feature determination unit, an audio processing unit and an audio output unit as described with respect to the first hearing device above.

According to a preferred aspect of the inventive technology, the primary input audio signal is transmitted from the first device to the second device for being used in audio signal processing on the second device. Advantageously, also the audio signal processing on the second device profits from information contained in the primary input audio signal. Particularly preferable, the first device and the second device may exchange the respective input audio signals. This is particularly advantageous if the second device is a further hearing device of the hearing system. In particular, the hearing system may allow for a symmetric audio signal processing on two hearing devices which exchange their respective input audio signals. An asymmetric steering of the two hearing devices and with that an inconsistent audio signal processing on the hearing devices is reliably avoided.

The primary input audio signal may be transmitted to the second device in a format, characteristic and/or metric outputted by the input audio unit of the first device. Additionally or alternatively, it is possible that the first device processes the primary input audio signal before transmitting. For example, the primary input audio signal may be beamformed, in particular may be beamformed in the time domain. Additionally or alternatively, the secondary input audio signal may be reduced in bandwidth and/or compressed.

According to a preferred aspect of the inventive technology, the second device determines a level feature based on the transmitted primary input audio signal and the secondary input audio signal and wherein the second device uses the level feature for steering an audio processing routine of an audio processing unit of the second device. The second device may in particular perform a corresponding audio signal processing as the first hearing device. This is in particular advantageous if the second device is a further hearing device of the hearing system. Audio signal processing on the hearing system may be symmetrically performed on both hearing devices. This allows for a consistent processing of audio signals on both hearing devices, avoiding irritation of the user.

According to a preferred aspect of the inventive technology, the level feature comprises a noise floor estimate (NFE), a sound pressure level (SPL), a signal-to-noise-ratio (SNR) and/or a low frequency level (LFL). These statistic properties are particularly suitable for steering audio processing routines.

According to a preferred aspect of the inventive technology, the at least one audio processing routine comprises a beamformer, a post-filter routine, a speech enhancement routine, a classifier, a noise canceller and/or a wind noise canceller. Such audio processing routines particularly profit from the steering by the level feature based on the primary and secondary input audio signals.

A beamformer routine may comprise a monaural beamformer, a binaural beamformer and/or a beamformer control for controlling the switching between binaural and monaural beamformer. A post-filter may in particular be a beamformer post-filter. The beamformer post-filter may be a sound cleaning algorithm that takes advantage of the spatial information, it allows to reduce the noises which are not coming from the region of interest, e.g.: diffuse noises.

In the following, particularly preferable combinations of audio processing routines and level features for steering the audio processing routines are given. The audio processing unit may comprise one or more of these audio processing routines, at least one of which is steerable by the level feature:

The audio processing routine may preferably be a binaural beamformer, being steered by level features F comprising the noise floor estimate and/or the signal-to-noise-ratio. This is particularly advantageous in hearing systems comprising two hearing devices. The second device may preferably be the respective other hearing device. The audio processing routine may, for example, receive the ipsi input audio signal and the contra input audio signal as input. Steering based on the level feature may in particular influence a mixing ratio of the ipsi input audio signal and the contra input audio signal. In particular, a mixing ratio of monaurally beamformed ipsi input audio signal and monaurally beamformed contra input audio signal may be determined by the steering.

Asymmetric steering a binaural beamformer may lead to confusion of the user, in particular because sound sources may not be heard at their actual location but shifted due to the asymmetric steering. The audio signal processing using the level feature F leads to more consistent and reliable audio signal processing, in particular avoiding confusion and/or irritation of the user.

The audio signal processing routine may be a monaural beamformer, being steered in particular by level features comprising a noise floor estimate and/or a signal-to-noise-ratio.

The audio signal processing routine may be a beamformer control, controlling the switching form monaural to binaural beamforming. The beamformer control may advantageously be steered using a level feature comprising the noise floor estimate and/or the signal-to-noise-ratio. Advantageously, the level feature may provide a criteria when to switch from a binaural beamformer processing to a monaural beamformer processing. The switching from binaural to monaural beamformer and back can be determined on the locally calculated level feature. Further interaction of the hearing devices to determine the switching are not required.

The audio processing routine may be a beamformer post-filter. The beamformer post-filter may advantageously be steered using a level feature comprising the noise floor estimate and/or the signal-to-noise-ratio.

The audio processing routine may be a speech enhancement routine, e.g. for performing soft speech enhancement. The speech enhancement routine may be advantageously steered using a level feature comprising the sound pressure level and/or the signal-to-noise-ratio, preferably with frequency resolution. For example, soft speech enhancement may advantageously steered by spectral level and SNR.

The audio processing routine may be a noise canceller. The noise canceller may advantageously be steered using a level feature comprising the noise floor estimate. Steering a noise canceller may be particularly prone to asymmetries due to an asymmetric acoustic scene, e.g. if the noise source is placed to one side of the hearing system user.

The audio processing routine may be a wind noise canceller. The wind noise canceller may advantageously be steered using a level feature comprising the noise floor estimate and/or a low frequency level. Steering a wind noise canceller may be particularly prone to asymmetries due to an asymmetric acoustic scene, e.g. if the wind blows from one side of the hearing system user. Particular suitable wind noise cancellers may be steered using a noise floor estimate. Additionally or alternatively, the wind noise canceller may be steered using a low frequency level. Using the low frequency level for steering is, in particular, advantageous for implementing a wind noise canceller, which works independently from a monaural beamformer.

The audio processing routine may be a classifier, in particular a classifier for classifying the acoustic scene. The classifier may in particular be steered using a level feature comprising the noise floor estimate and/or the sound pressure level, preferably with frequency resolution. Based on the classification result, the audio signal processing may be adapted to the respective acoustic environment. Using the level feature, which is based on primary and secondary input audio signals, is particularly advantageous for hearing systems comprising two hearing devices because the classification on both hearing devices is more consistent and symmetric, resulting in consistent and symmetric adaption of the audio signal processing. The classifier output may, for example, determine whether beamforming is executed binaurally or monaurally.

According a preferred aspect of the inventive technology, steering the audio processing routine determines a mixing ratio of the primary input audio signal and the secondary input audio signal used in the audio signal processing routine. This is particularly advantageous for binaural audio signal processing, e.g. if the second device is a further hearing device of the hearing system. Depending on the acoustic environment, a different mixture of the primary input audio signal and the secondary input audio signal may be used for the further processing, in particular in a binaural beamformer.

According to a preferred aspect of the inventive technology, the transmitted secondary input audio signal is a beamformed audio signal. Transmitting a beamformed audio signal allows to transmit spatial information, in particular in a compact data format. This way, spatial information, which may in particular be obtained using several microphones of the second device, can be considered in the determination of the level feature and/or the further audio signal processing on the first device.

The transmitted secondary input audio signal may in particular be a monaurally beamformed audio signal.

Particularly preferable, the primary input audio signal may be transmitted to the second device in form of a beamformed, in particular a monaurally beamformed, audio signal. The to be transmitted primary input audio signal may in particular be beamformed. For example, the primary input audio signal may comprise inputs of several microphones of the first device. Before transmitting the primary input audio signal, the primary input audio signal may be beamformed to transmit spatial information contained in the primary input audio signal.

According to a preferred aspect of the inventive technology, the secondary input audio signal is transmitted with reduced bandwidth. This way, data load on a data connection of the first device and the second device, in particular a wireless data connection, may be reduced. The secondary input audio signal may have a different format or metric than the primary input audio signal. As the inventors have realized, different formats and metrics do not significantly impact the determination of the level feature, so that significant improvement of the symmetry of the steering of the audio processing routine may be achieved also with different formats and/or metrics of the primary and secondary input audio signals.

Preferably, the primary input audio signal and the secondary input audio signal are transmitted to the respective other device with reduced bandwidth. This way, exchange of the respective input audio signals may be performed with reduced data load.

Particularly preferable, the primary input audio signal and/or the secondary input audio signal are transmitted to the respective other device in form of a beamformed audio signal with reduced bandwidth.

It is a further object of the inventive technology to improve a hearing system, in particular to provide a hearing system, which features consistent and stable audio signal processing.

This object is achieved by a hearing system as claimed. The hearing system comprises a first device being a hearing device and a second device, wherein the second device is configured for obtaining a secondary input audio signal and transmitting the secondary input audio signal to the first device. The first device comprises an audio input unit for receiving a primary input audio signal, a data interface for receiving the secondary input audio signal, a feature determination unit, an audio processing unit for processing the primary input audio signal and/or the secondary input audio signal to obtain an output audio signal by applying at least one audio processing routine, and an audio output unit for outputting the output audio signal. The feature determination unit is configured for determining a level feature based on the primary input audio signal and the secondary input audio signal. The audio processing unit is configured to use the level feature for steering the at least one audio processing routine. The hearing system allows for a consistent steering of the at least one audio processing routine of the audio processing unit. The hearing system has the same advantages as discussed with respect to the method above. The hearing system may further comprise any of the optional features discussed with respect to the method above.

According to a preferred aspect of the inventive technology, the feature determination unit is configured to determine the level feature by determining a primary level feature based on the primary input audio signal, determining a secondary level feature based on the secondary input audio signal, and averaging the primary level feature and the secondary level feature to obtain the level feature. The feature determination unit is particularly suitable to process input audio signals of different format and/or metric to determine the level feature. The feature determination unit may comprise one of the optional or preferred features discussed with respect to the method above.

According to a preferred aspect of the inventive technology, the second device is a hearing device, which may be referred to as second hearing device. In particular, the hearing system may comprise two hearing devices being connected to each other via a wireless data connection, in particular a wireless link. The hearing system may be a binaural hearing system. The hearing system may preferably be configured for binaural audio processing on the two hearing devices. The second hearing device may be configured as the first device. In particular, the second hearing device may comprise an audio input unit for receiving a secondary input audio signal, a data interface for receiving the primary input audio signal from the first device, a feature determination unit for determining a level feature based on the primary input audio signal and the secondary input audio signal, an audio processing unit for processing the primary input audio signal and/or the secondary input audio signal to obtain an output audio signal using at least one audio processing routine, and an audio output unit for outputting the output audio signal, wherein the audio processing unit is configured to use of the level feature for steering the at least one audio processing routine. With regard to the one of the hearing devices, the respective other hearing device may be seen as a second device. In this sense, the nomenclature regarding the primary and secondary audio signals may be inverted.

According to a preferred aspect of the inventive technology, the first device is configured to transmit the primary input audio signal to the second device and wherein the second device is configured for audio signal processing using the transmitted primary input audio signal. The primary input audio signal may, for example, be transmitted using the data interface of the first device. In particular, the first device may be configured to process, in particular beamform, the primary input audio signal before transmitting the processed, in particular beamformed, primary input audio signal to the second device. This is particularly advantageous if the second device is a hearing device, e.g. for using the primary input audio signal for binaural processing on the second device.

The second device may in particular be configured for determining a level feature based on the secondary input audio signal obtained by the second device and the transmitted primary input audio signal. The level feature may in particular be used for steering an audio processing routine of the second device, in particular of a secondary hearing device.

It is a further object of the present inventive technology to improve a hearing device, in particular to provide a hearing device which allows for consistent and reliable audio signal processing.

This object is achieved by a hearing device as claimed. The hearing device comprises an audio input unit for obtaining a primary input audio signal, a data interface for receiving a secondary input audio signal, a feature determination unit for determining a level feature based on the primary input audio signal and the secondary input audio signal, an audio processing unit for processing the primary input audio signal and/or the secondary input audio signal to obtain an output audio signal using at least one audio processing routine, and an audio output unit for outputting the output audio signal, wherein the audio processing unit is configured to use the level feature for steering the at least one audio processing routine. The hearing device allows for steering the at least one audio processing routine, taking into account a secondary input audio signal. The hearing device does not depend on the transmittal of a level feature from an external device, but is configured to determine a level feature locally based on a primary input audio signal, obtained by the hearing device itself, and a secondary input audio signal transmitted from an external device. As such, the hearing device allows for a consistent and precise steering of the at least one audio processing routine and with that for an improved audio signal processing. The hearing device may comprise one or more of the optional features discussed with regard to the method and/or hearing system above.

BRIEF DESCRIPTION OF THE DRAWINGS

Further details, features and advantages of inventive technology are obtained from the description of exemplary embodiments with reference to the figures, in which.

DETAILED DESCRIPTION

Figure 1:
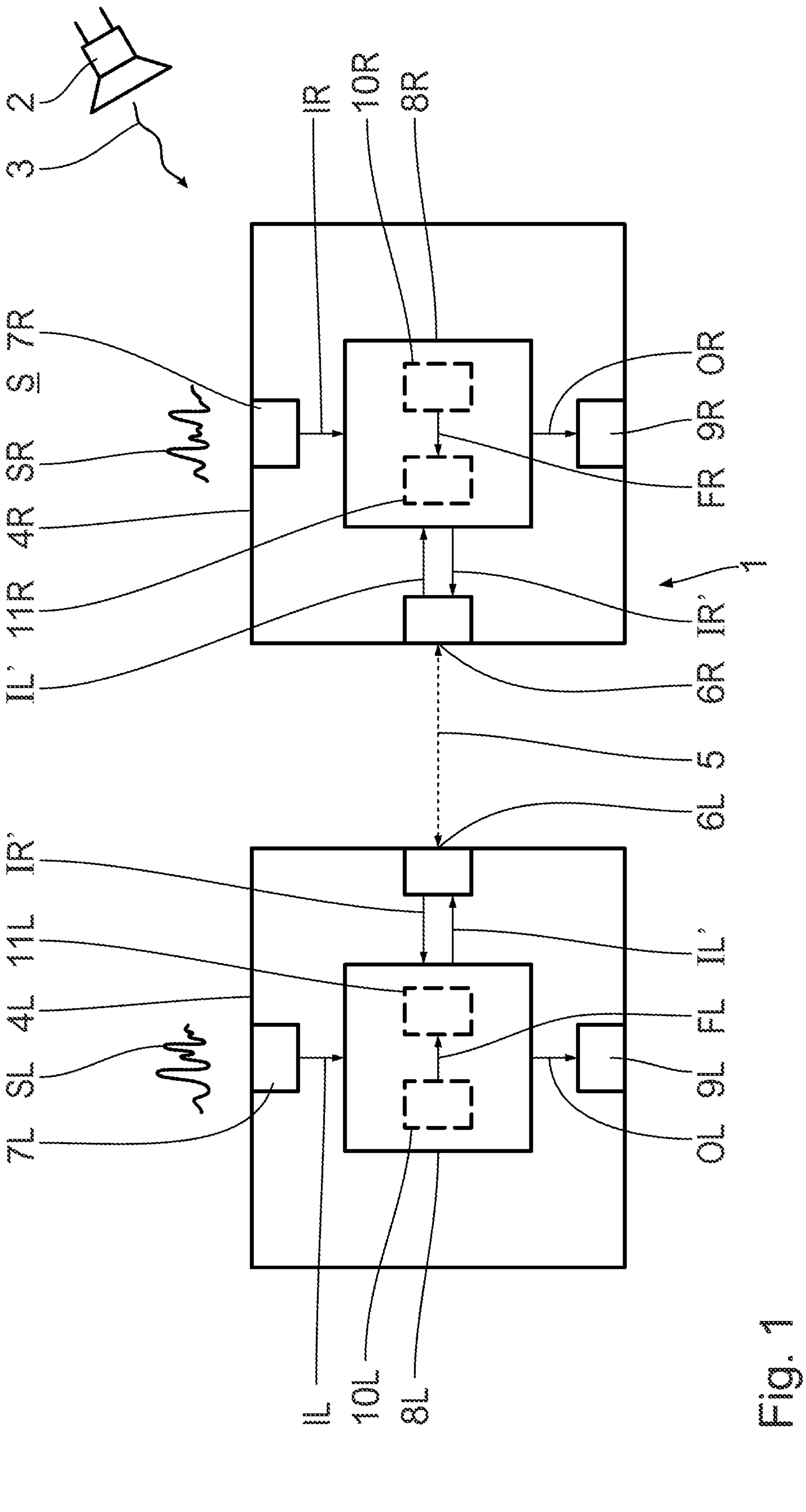
FIG. 1 shows a schematic depiction of a hearing system comprising two hearing devices.

FIG. 1 schematically shows a hearing system 1, belonging to a hearing system user (not shown). FIG. 1 further shows a sound source 2 emitting a sound 3, which is part of an ambient sound S.

The hearing system 1 comprises two hearing devices 4L, 4R. The hearing devices 4L, 4R of the shown embodiment are wearable or implantable hearing aids, being associated with the left and right ear of the user, respectively. Here and in the following, the appendix "L" to a reference sign indicates that the respective device, component or signal is associated with or belongs to the left hearing device 4L. The appendix "R" to a reference sign indicates that the respective device, component or signal is associated with or belongs to the right hearing device 4R. In case reference is made to both hearing devices 4L, 4R, their respective components or signals, the respective reference sign may also be used without an appendix. For example, the hearing devices 4L, 4R may commonly be referred to as the hearing devices 4 for simplicity.

The hearing system 1 may further comprise one or more peripheral devices (not shown). For example, a peripheral device may be provided in form of a smartphone or another portable device, in particular a mobile device, such as a tablet, smartwatch and/or smartphone. In some embodiments, the one or more peripheral devices may comprise a wireless microphone.

The hearing devices 4L, 4R are connected to each other in a data-transmitting manner via a wireless data connection 5. The wireless data connection 5 may also be referred to as wireless link.

The hearing devices may be connected to optional peripheral devices by corresponding wireless data connections. Any suitable protocol can be used for establishing the wireless data connection 5. For example, the wireless data connection 5 may be a Bluetooth connection or may use similar protocols, such as for example Asha Bluetooth. Further exemplary wireless data connections are DM transmitters, aptX LL, induction transmitters (NFMI) and/or any proprietary connection protocol. For establishing the wireless data connection 5, the hearing devices 4L, 4R each comprise a data interface 6L, 6R.

The hearing device 4L comprises an audio input unit 7L for obtaining an input audio signal IL. The hearing device 4L further comprises a computing device 8L for audio signal processing. The computing device 8L receives the input audio signal IL as well as further data from the data interface 6L for audio signal processing to obtain an output audio signal OL. The hearing device 4L further comprises an audio output unit 9L for outputting the output audio signal OL.

The right hearing device 4R comprises an audio input unit 7R, a processing device 8R and an audio output unit 9R. The audio input unit 7R provides an input audio signal IR. The processing device 8R obtains the output audio signal OR based on the input audio signal IR and further data obtained via the data interface 6R. The output audio signal OR is outputted by the audio output unit 9R.

In the present embodiment, the audio input units 7 may comprise one or more electroacoustic transducers, especially in the form of one or more microphones. Preferably, the audio input units 7 comprise two or more electroacoustic transducers, for example a front microphone and a rear microphone, to obtain spatial information on the respective input audio signal IL, IR.

The audio input unit 7L receives ambient sound SL and provides the input audio signal IL. The audio input unit 7R receives ambient sound SR and provides the audio input signal IR. Due to the different positions of the hearing devices 4L, 4R, the respective ambient sound SL, SR may be different. For example, a sound source, such as the sound source 2, may be positioned closer to one of the hearing devices 4L, 4R so that the audio input units 7L, 7R receive the respective sound 3 differently. For example, the respective ambient sound SL, SR may vary due to head shadowing. Being based on different ambient sounds SL, SR, also the respective input audio signals IL, IR may differ.

An audio signal, in particular the input audio signals IL, IR and the audio output signal OL, OR, may be any electrical signal which carries acoustic information. For example, the input audio signal I may be raw audio data which is obtained by the respective audio input unit 7 by receiving the respective ambient sound S. The input audio signals I may further comprise processed audio data, e.g. compressed audio data and/or a spectrum obtained from the ambient sound S.

The respective computing devices 8L, 8R of the hearing devices 4L, 4R are not depicted in detail. The computing devices 8 perform audio signal processing to obtain the respective output audio signal. As schematically depicted, the processing devices each comprise a feature determination unit 10L, 10R and an audio processing unit 11L, 11R. The audio processing units 11 perform the actual audio signal processing to obtain the output audio signal OL, OR. The audio signal processing uses at least one audio processing routine. The respective feature determination units 10L, 10R determine level features FL, FR based on input audio signals. The level features FL, FR are used to steer at least one audio processing routine of the respective audio signal processing units 11L, 11R. The audio signal processing will be described in greater detail below.

In the shown embodiment, the feature determination unit 10L and the audio processing unit 11L are part of the common computing device 8L. In this sense, the feature determination 10L and the audio processing unit 11L may be regarded as functional units being implemented in the common computing device 8L. In other embodiments, the feature determination unit 10L and the audio processing unit 11L may be independent of each other, in particular may be comprised by respective separate computing devices. The same considerations apply for the feature determination unit 10R and the audio processing unit 11R of the hearing device 4R.

In the present embodiment, the respective audio output units 9L, 9R comprise an electroacoustic transducer, in particular in form of a receiver. The audio output units 11L, 11R provide a respective output sound to the user of the hearing system 1, e.g. via a respective receiver. Furthermore, the audio output units 11 can comprise, in addition to or instead of the receivers, an interface that allows for outputting electric audio signals, e.g., in the form of an audio stream or in the form of an electrical signal that can be used for driving an electrode of a hearing aid implant.

The hearing devices 4L, 4R of the hearing system 1 are configured for binaural audio processing. The hearing devices 4L, 4R exchange respective input audio signals IL', IR' via the wireless data connection 5. Before transmitting the respective input audio signal IL', IR' to the other hearing device, the input audio signals IL, IR, obtained by the audio input units 7L, 7R, respectively, may be processed and/or modified. For example, the input audio signal IL, IR may be beamformed and/or reduced in frequency bandwidth. It is additionally or alternatively possible to compress the input audio signal IL, IR before transmittal. The transmitted input audio signals indicated with the reference signs IL', IR', to highlight the possibility of prior modification to the input audio signals IL, IR.

The input audio signal IL', IR' received from the other hearing device 4L, 4R is used in the audio signal processing of the hearing device. As can be seen from FIG. 1, the processing device 8L provides the, optionally processed and/or modified, input audio signal IL' to the data interface 6L. The processing device 8L receives the transmitted input audio signal IR' from the data interface 6L. Correspondingly, the processing device 8R receives the transmitted input audio signal IL' from the data interface 6R and provides the, optionally processed and/or modified, input audio signal IR' to the data interface 6R.

Each of the hearing devices 4L, 4R provides supplementary data in form of the input audio signals IL', IR', which can be used in the audio signal processing on the respective other hearing device 4R, 4L. When seen from one of the hearing devices 4L, 4R, the respective other hearing device 4R, 4L may be considered as a second device, which provides secondary data for being used in the audio signal processing on the hearing device 4L, 4R. The received input audio signal IR', IL' serves as a secondary input audio signal for the audio signal processing on the receiving hearing device 4L, 4R. As such one of the hearing devices 4 may be referred to as a first hearing device or first device, while the other hearing device may be referred to as second hearing device or second device.

Figure 2:
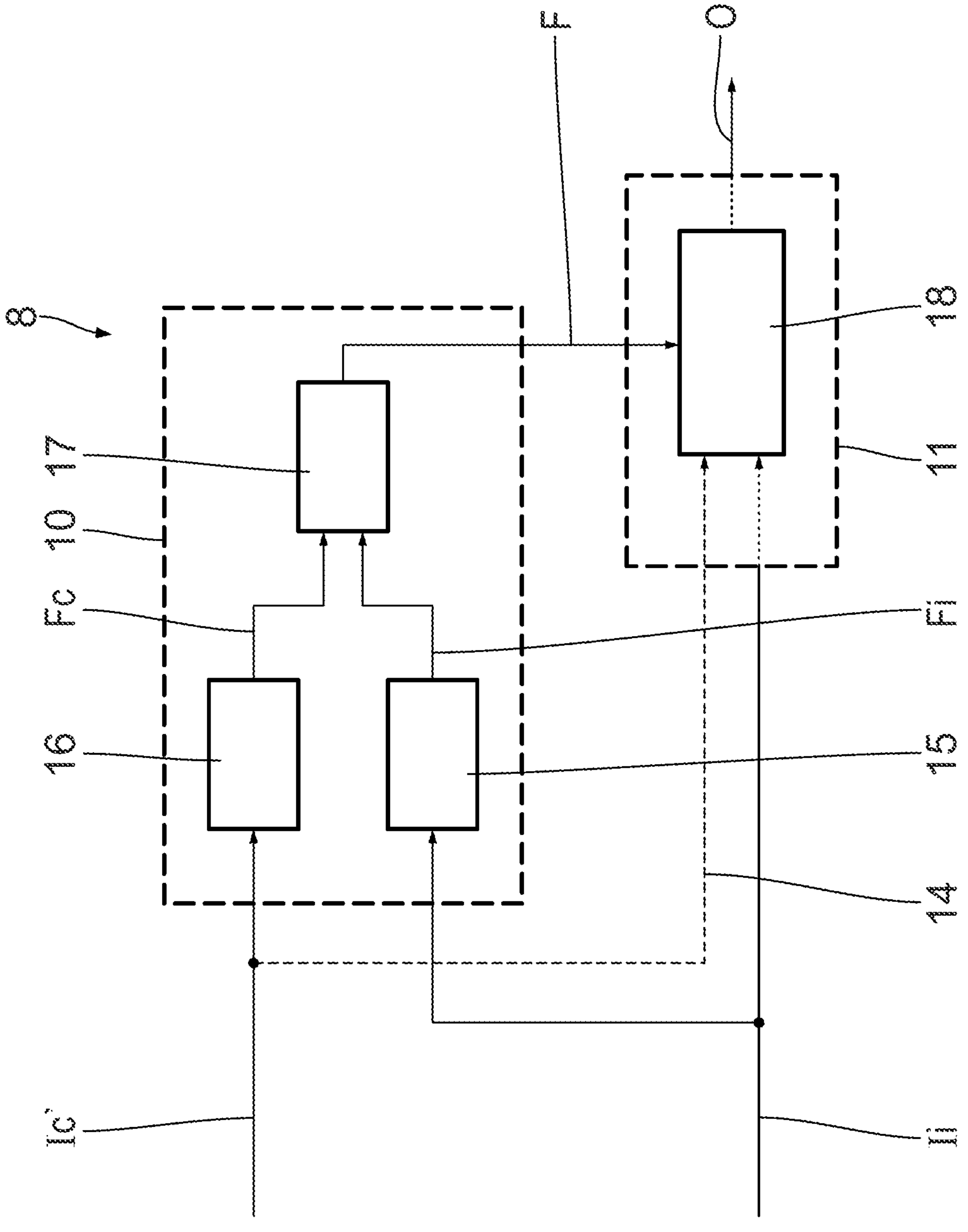
FIG. 2 shows a schematic depiction of audio signal processing on one of the hearing devices of the hearing system of FIG. 1.

The audio signal processing is described in greater detail with respect to FIG. 2. FIG. 2 schematically depicts the audio signal processing by a processing device 8 of one of the hearing devices 4L, 4R. The further description applies for both of the hearing devices 4L, 4R. For the simplicity of notation, the individual hearing device (L or R) is no longer explicitly specified in the further description. For a clear distinction of audio signals, in particular input audio signals, which have been obtained by the hearing device itself, and those audio signals, in particular input audio signals, which have been transmitted from the other hearing device, respective signals are indicated as “ipsi” and “contra”, respectively. “Ipsi” refers to audio signals, which have been obtained by the hearing device itself, while “contra” indicates audio signals, which have been transferred from the other hearing device, the latter being also referred to as “contra side”. The same notation applies for further components and data, in particular level features, which contribute to the audio signal processing. With regard to the reference signs, “ipsi” is indicated by the appendix “i”, while “contra” is indicated by the appendix “c”. For example, with reference to the hearing device 4L, the input audio signal IL obtained by the audio input unit 7L, will be referred to as the ipsi input audio signal Ii. The received input audio signal IR' is referred to as contra input audio signal Ic'.

As discussed above, the respective other hearing device and the audio signals transmitted therefrom may also be regarded as a second device and secondary audio signals, respectively. In correspondence to that, the ipsi audio signals, data and components may be referred to as primary audio signals, data or components, while the contra audio signals, data and components may be also referred to as secondary audio signals, data and components.

The processing device 8 comprises the feature determination unit 10 and the audio processing unit 11. The processing device 8 receives as an input the ipsi input audio signal Ii (primary input audio signal) and the contra input audio signal Ic' (secondary input audio signal) received from the contra hearing device.

The feature determination unit 10 receives the ipsi input audio signal Ii and the contra input audio signal Ic' as input. The feature determination unit 10 determines a level feature F based on the ipsi input audio signal Ii and the contra input audio signal Ic'. The level feature F comprises an estimate of one or more statistical properties in the audio signals. The level feature F may in particular comprise a noise floor estimate (NFE), a sound pressure level (SPL), a signal-to-noise-ratio (SNR) and/or a low frequency level (LFL).

For determining the level feature F, the ipsi input audio signal Ii and the contra input audio signal Ic' are first processed individually. In a ipsi feature determination step 15, an ipsi level feature Fi (primary level feature) is determined based on the ipsi input audio signal Ii. In a contra feature determination step 16, a contra level feature Fc (secondary level feature) is determined from the contra input audio signal Ic'. The individual determination of the ipsi level feature Fi and the contra level feature Fc has the advantage, that the ipsi input audio signal Ii and the contra input audio signal Ic' do not necessarily have to be in the same or a compatible format and/or metric, in order to be commonly processed to determine the level feature F. For example, it is possible to use the omni input audio signal, in particular the unprocessed input audio signal which is received by one or more of the microphones of an audio input unit of the hearing device for calculating the primary level feature, in particular the ipsi level feature. On the other hand, the secondary level feature, in particular the contra level feature, may be determined based on a transmitted secondary input audio signal, which may already be processed input audio signal from a second device, in particular a contra hearing device. For example, the contra input audio signal Ic' may be a beamformed input audio signal, in particular with reduced bandwidth. This allows to reduce the data load on the wireless data connection.

The ipsi level feature Fi and the contra level feature Fc are passed to an averaging routine 17. Averaging routine 17 averages the ipsi level feature Fi and the contra level feature Fc to obtain the level feature F. The level feature F is outputted by the feature determination unit 10 and passed to the audio processing unit 11. Also in case of different formats and/or metrics of the respective input audio signals Ii, Ic', the averaging of the respectively determined level features Fi, Fc results in a significant improvement of the symmetry of the resulting level features and the respective steering of the at least one audio processing routine. This is further illustrated with respect to FIGS. 6 to 8 below.

In the embodiment shown in FIG. 2, the ipsi input audio signal Ii is inputted to the audio processing unit 11 to be processed to obtain the output signal O. In other embodiments, the output signal O may be obtained from the ipsi input audio signal Ii and/or the contra input audio signal Ic', in particular a mixture thereof. In FIG. 2, dashed line 14 symbolizes the optional inclusion of the contra input audio signal Ic' in the audio signal processing by the audio processing unit 11.

The audio processing unit 11 comprises at least one audio processing routine 18, which is used in the audio signal processing of the ipsi input audio signal Ii and/or the contra input audio signal Ic'.

The audio processing routine 18 performs one or more steps of the audio signal processing of the ipsi input audio signal Ii and/or the contra input audio signal Ic'. As indicated by dotted lines in the signal path within the audio processing routine 11, further processing steps or routines may be applied to the input audio signals before or after the audio processing routine 18. In particular, the ipsi input audio signal Ii and/or the contra input audio signal Ic' may be preprocessed and/or postprocessed before and/or after the audio processing routine 18.

The audio processing routine 18 receives the level feature F as steering parameters. The level features F are used to steer the audio processing routine 18. In other words, the audio signal processing of the audio processing routine 18 is steered based on the determined level features F. This way, suitable statistic properties of the ipsi input audio signal Ii and the contra input audio signal Ic' may influence the audio signal processing, thereby optimizing the audio signal processing for the given use case.

Determining the level feature F based on the ipsi input audio signal Ii and the contra input audio signal Ic' allows for a more consistent steering of the audio processing routine 18. In particular, negative influences of asymmetric acoustic scenes on the steering of the audio signal processing are avoided. In the embodiment of FIG. 1, a consistent steering on both hearing devices 4 is achieved. In particular, differences in the respective input audio signals IL, IR do not lead to an inconsistent, different steering of the audio signal processing on the individual hearing devices 4L, 4R. As shown in FIG. 1, the audio source 3 may be positioned asymmetrically with respect to the hearing devices 4L, 4R. In such circumstances, the sound 3 may stronger influence the ambient sound SR received by the right hearing device 4R than the ambient sound SL, received by the left hearing device 4L. Calculating the respective level features only from the ipsi input audio signal may, in such situation, lead to an asymmetric, different steering of the audio signal processing on the hearing devices 4L, 4R. Determining the level feature F based on ipsi and contra input audio signals avoids such inconsistencies and asymmetries in the steering of the audio processing routine 18.

Particularly advantageous, the level features Fi, Fc based on ipsi input audio signal Ii and contra input audio signal Ic', respectively, are locally calculated on the respective hearing device itself. Thus, there is no need to transmit level features from one of the hearing devices to the other. Only the respective input audio signal IL, IR has to be transmitted using the wireless data connection 5. This reduces data load on the wireless data connection 5 and energy consumption for the data transmission. Latency issues due to the transmittal are reduced. The respective input audio signals may be transmitted in many use cases, in particular for binaural audio signal processing.

The processing scheme shown in FIG. 2 depicts the general idea of using the averaged level features F for steering the audio processing routine 18. This routine may be used for any suitable audio processing routine, in particular for any suitable combination of audio processing routine and level feature. In the following, some exemplary combinations of suitable level features F and audio signal processing routines 18 are described:

In an exemplary embodiment, the audio processing routine 18 is a binaural beamformer, being steered using a level feature F comprising the noise floor estimate and/or the signal-to-noise-ratio. Steering based on the level feature F may, e.g., influence a mixing ratio of the ipsi input audio signal Ii and the contra input audio signal Ic. In particular, a mixing ratio of monaurally beamformed ipsi input audio signal Ii and monaurally beamformed contra input audio signal Ic may be determined by the steering.

In a further exemplary embodiment, the audio signal processing routine 18 is a monaural beamformer, being steered using a level feature F comprising a noise floor estimate and/or a signal-to-noise-ratio.

In a further exemplary embodiment, the audio signal processing routine 18 is a beamformer control, controlling the switching form monaural to binaural beamforming. The beamformer control is advantageously steered using a level feature F comprising the noise floor estimate and/or the signal-to-noise-ratio. Advantageously, the level feature provides a criteria, when to switch from a binaural beamformer processing to a monaural beamformer processing.

In a further exemplary embodiment, the audio signal processing routine 18 is a beamformer post-filter. The beamformer post-filter is advantageously steered using a level feature F comprising the noise floor estimate and/or the signal-to-noise-ratio.

In a further exemplary embodiment, the audio signal processing routine 18 is a speech enhancement routine. The speech enhancement routine is advantageously steered using a level feature F comprising the sound pressure level and/or the signal-to-noise-ratio with frequency resolution.

In a further exemplary embodiment, the audio signal processing routine 18 is a noise canceller. The noise canceller is advantageously steered using a level feature F comprising the noise floor estimate.

In a further exemplary embodiment, the audio signal processing routine 18 is a wind noise canceller. The wind noise canceller is advantageously steered using a level feature F comprising the noise floor estimate and/or the low frequency level.

In a further exemplary embodiment, the audio signal processing routine 18 is a classifier, in particular a classifier for classifying the acoustic scene. The classifier is advantageously steered using a level feature F comprising the noise floor estimate and/or the sound pressure level with frequency resolution.

In further exemplary embodiments, two or more of the above audio processing routines and the respective steering may be combined in the audio signal processing. For example, a beamformer control may be steered using the level feature F. Dependent on the beamformer control, either the monaural or the binaural beamformer is used for further audio signal processing. The monaural and/or the binaural beamformer can be steered using the level feature. Additionally or alternatively, a beamformer post-filter may be steered using the level feature.

Figure 3:
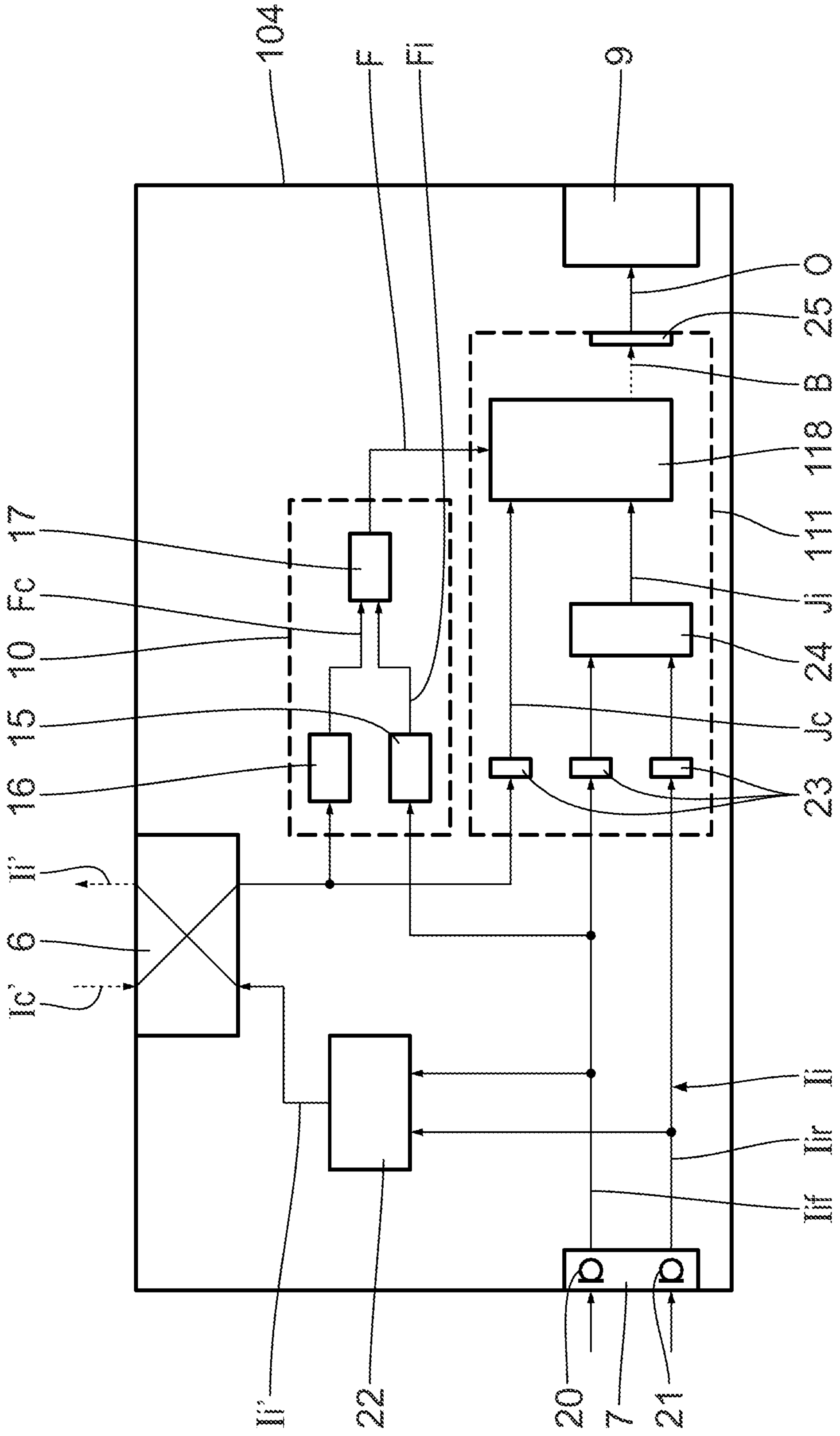
FIG. 3 shows a schematic depiction of a further embodiment of audio processing on a hearing device of a hearing system.
Figure 4:
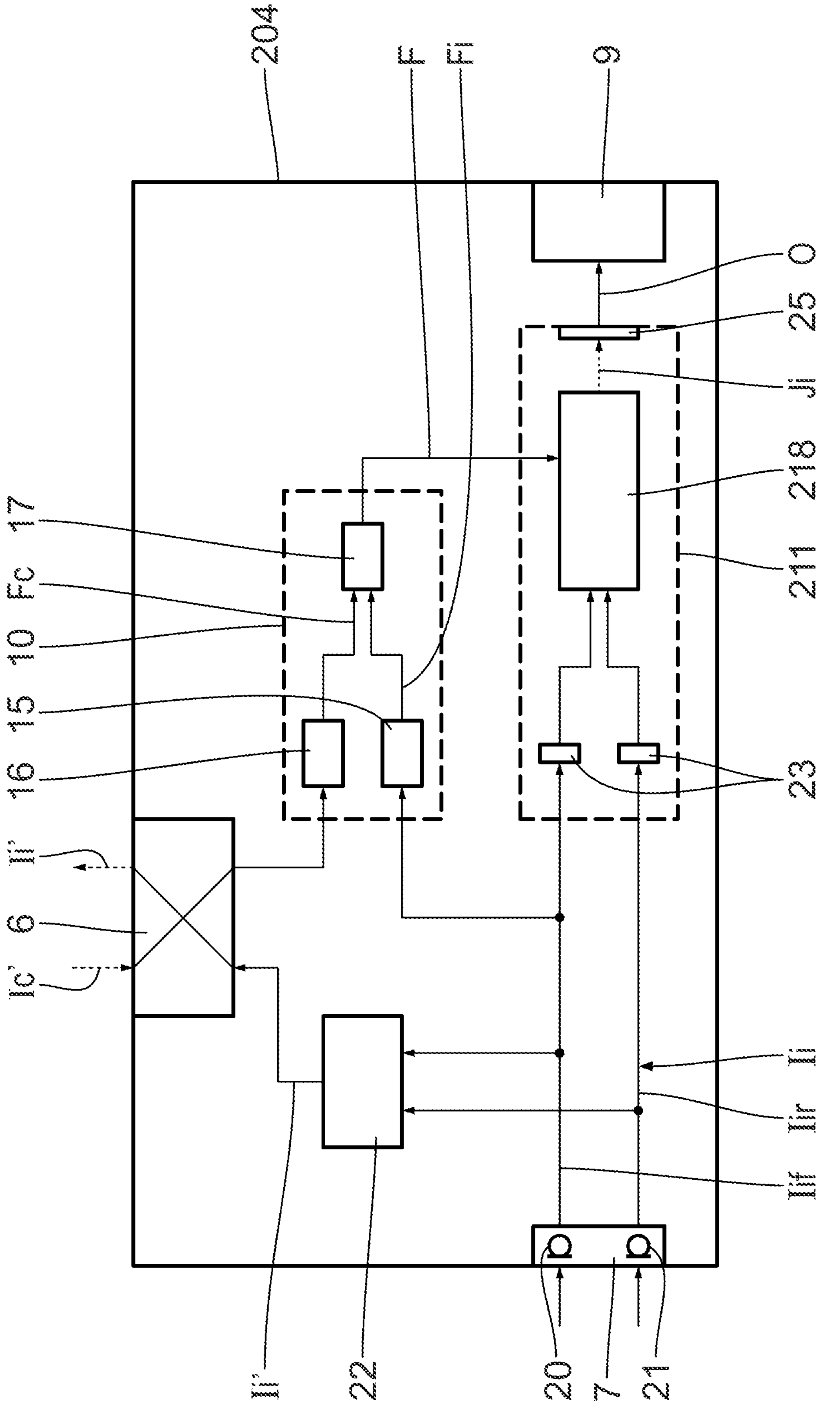
FIG. 4 shows a schematic depiction of a further embodiment of audio processing on a hearing device of a hearing system.
Figure 5:
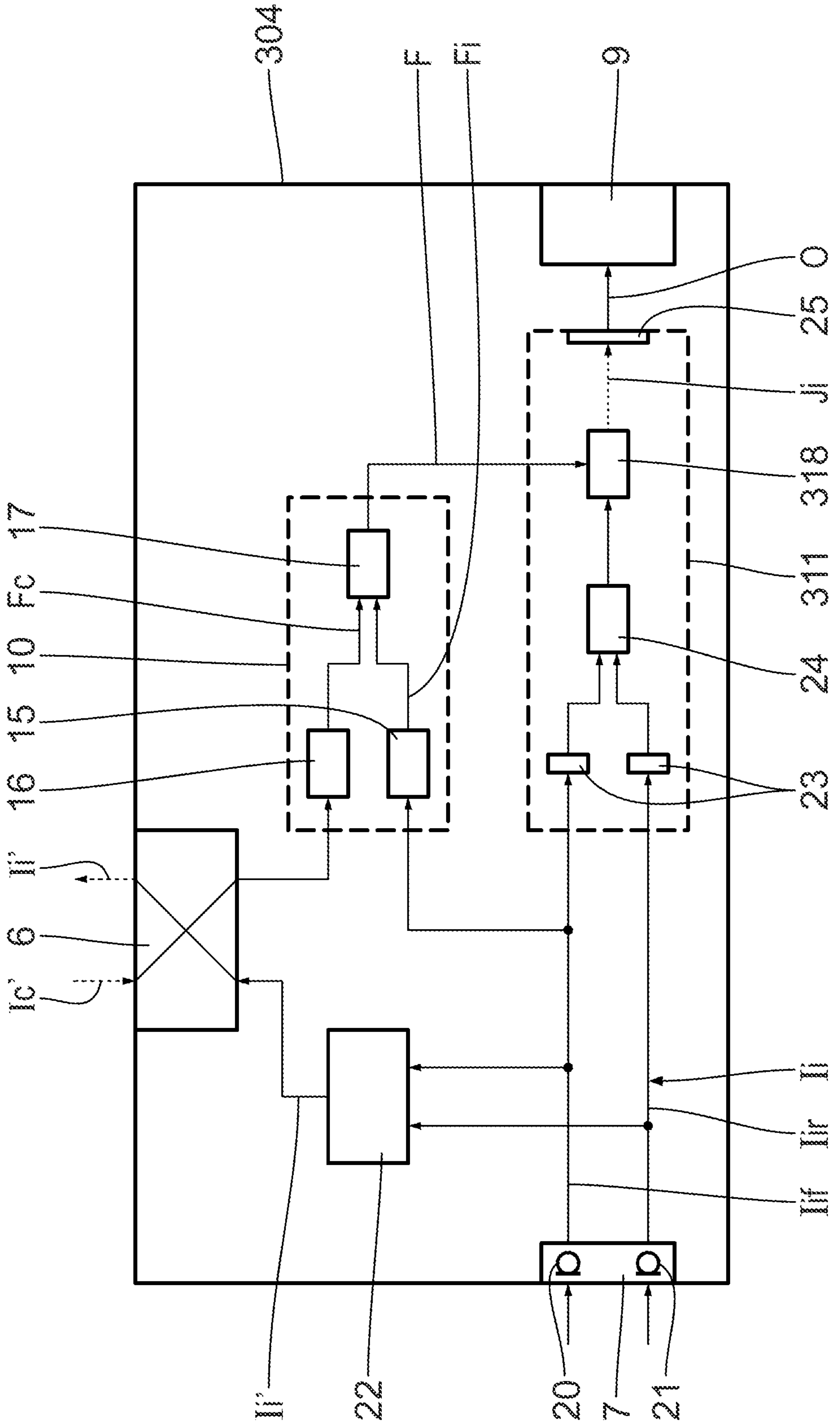
FIG. 5 shows a schematic depiction of a further embodiment of audio processing on a hearing device of a hearing system.

With regard to FIGS. 3 to 5, specific embodiments of audio processing routines on a hearing device of a hearing system are described. The respective audio signal processing may advantageously be performed on one or both of the hearing devices 4L, 4R of the hearing system 1 in FIG. 1. Preferably, the respective audio signal processing is performed on both of the hearing devices 4L, 4R of the hearing system 1.

FIG. 3 shows an exemplary audio signal processing on a hearing device 104. Devices, components, audio signals and other data, which have been described with respect to the embodiment in FIGS. 1 and 2, carry the same reference numbers and are not explained in detail again.

The hearing device 104 is part of a hearing system (not shown) comprising a second hearing device (not shown). When seen from hearing device 104, the further hearing device is also referred to as contra hearing device or contra side.

The hearing device 104 comprises the data interface 6, the audio input unit 7 and the audio output unit 9. A processing device of the hearing device 104 is not shown explicitly.

As shown in FIG. 3, the input audio unit 7 comprises a front microphone 20 and a rear microphone 21. Front microphone 20 and rear microphone 21 receive respective ambient sound to obtain respective parts of the ipsi input audio signal Ii, namely the front input audio signal Iif and the rear input audio signal Er. Comprising the front input audio signal Iif and the rear input audio signal Er, the ipsi input audio signal Ii contains spatial information, which may be used in the further processing, in particular in a monaural and/or binaural beamformer.

Both parts of the ipsi input audio signal Ii are fed into a monaural beamformer 22. Monaural beamformer 22 produces a beamformed ipsi input audio signal hi'. Beamformed ipsi input audio signal Ii' is transmitted to the other hearing device (not shown) using the data interface 6. The beamformed ipsi input audio signal Ii' is transmitted with reduced bandwidth.

The data interface 6 receives a contra input audio signal Ic'. The contra input audio signal Ic' is provided by the other hearing device (not shown). The contra input audio signal Ic' is a beamformed input audio signal from the other hearing device. The contra input audio signal Ic' is transmitted from the other hearing device with reduced bandwidth.

The hearing device 104 comprises the feature determination unit 10, which functions as described with respect to FIG. 2. The feature determination unit 10 receives the contra input audio signal Ic' to determine a contra level feature Fc in a contra feature determination step 16. The feature determination unit 10 further receives the front input audio signal Iif, being a part of the ipsi input audio signal Ii. From the front input audio signal Iif, the ipsi level feature Fi is determined in a ipsi feature determination step 15. In other embodiments, feature determination unit may receive the complete ipsi input audio signal Ii and/or another part of the ipsi input audio signal Ii and/or the beamformed ipsi input audio signal Ii'.

Ipsi level feature Fi and contra level feature Fc are averaged in an averaging step 17 to determine the level feature F. Ipsi level feature Fi, contra level feature Fc and with that level feature F are a noise floor estimate (NFE) and/or a signal-to-noise-ratio (SNR), in particular a noise floor estimate.

Hearing device 104 comprises the audio processing unit 111. Audio processing unit 111 performs audio signal processing on the ipsi input audio signal Ii and the contra input audio signal. Audio signal processing is performed in a suitable metric, format and/or domain of the audio signal. For example, audio signal processing may be performed in the frequency-domain. For that purpose, input audio signals to the audio processing unit 111 are transformed into the respective metric, format and/or domain, in particular into frequency-domain. Preferably, transformation into frequency-domain may be performed using a short-time Fourier transformation. The audio processing unit 111 may generally comprise one or more transformation units for transforming the input audio signals. In the shown embodiment, audio processing unit 111 comprises a transformation unit 23 for each input audio signal inputted to the audio processing unit 111. The transformation units are each configured for performing the respective transformation step. In other embodiments, a single transformation unit may be transform two or more of the input audio signals. The one or more transformation units may also perform other processing steps on the input audio signals, in particular for conditioning the input audio signals for further processing. For example, the input audio signals may be weighted by the one or more transformation units. Transformation of the input audio signals may include weighting of the input audio signals.

Audio processing unit 111 receives both parts of the ipsi input audio signal Ii. Both parts of the ipsi input audio signal Ii are fed into a monaural beamformer 24. Monaural beamformer 24 works in the frequency-domain and produces a beamformed ipsi input audio signal Ji. Contra input audio signal Ic' is inputted to the audio processing routine 111 and transformed, in particular into frequency-domain, using a respective transformation unit 23, resulting in the contra input audio signal Jc.

Beamformed ipsi input audio signal Ji and contra input audio signal Jc are inputted into an audio processing routine 118. The audio processing routine 118 is a binaural beamformer. The binaural beamformer 118 combines the ipsi input audio signal Ji and the contra input audio signal Jc to generate a binaurally beamformed audio signal B. The audio processing routine 118 is steered using the level feature F. The level feature F in particular determines a mixing ratio of the beamformed ipsi input audio signal Ji and the beamformed contra input audio signal Jc in the binaurally beamformed audio signal B. For example, symmetric, in particular 1:1, mixing ratios lead to a high directionality information content of the binaurally beamformed audio signal B. However, symmetric, in particular 1:1, mixing ratios lead to a loss of binaural cues. Such a symmetric, in particular 1:1, mixing ratio may be advantageous in loud surroundings with diffuse noises, in particular diffuse background noises, such as many speakers. In such cases, higher directionality information content may outweigh the reduction of binaural cues. In contrast, more asymmetric mixing ratios increase the binaural cues and are, thus, helpful in situations with fewer sound sources, in particular fewer speakers.

Steering the audio processing routine 118 being a binaural beamformer using the level feature F has the particular advantage that information content from ipsi and contra side are considered in the steering, without the need of transferring additional data from/to the contra side. This way, an asymmetric steering of binaural beamformers of the two hearing devices is avoided.

The binaurally beamformed audio signal B is transformed back into a metric, format and/or domain, which is suitable for output audio signal O. For example, the back transformation may comprise transformation into time-domain. The audio processing unit 111 comprises a back transformation unit 25 for performing the back transformation step. Back transformation may be performed directly on the binaurally beamformed audio signal B. Alternatively, the binaurally beamformed audio signal B may undergo further audio signal processing steps, as indicated by the dotted line. After the back transformation step, the output audio signal O results which is provided to the audio output unit 9 and outputted to the user.

In FIG. 4, a further embodiment of audio signal processing on a hearing device 204 is described. Devices, components, audio signals and other data, which have been described with respect to the embodiment in FIG. 3, carry the same reference numbers and are not explained in detail again.

Hearing device 204 is part of hearing system (not shown) comprising a further hearing device (not shown). From the perspective of hearing device 204, the further hearing device is also referred to as contra hearing device or contra side.

The hearing device 204 differs from the hearing device 104, which is described with respect to FIG. 3, only in the audio processing routine 211. The audio processing routine 211 only receives the ipsi input audio signal Ii. After transformation by the respective transformation units 23, the transformed components of the ipsi input audio signal Ii are transferred to the audio processing routine 218. The audio processing routine 218 is a monaural beamformer. The monaural beamformer is steered by the level feature F comprising a noise floor estimate (NFE) and/or a signalto-noise-ratio (SNR), preferably being a noise floor estimate.

The audio processing routine 218 generates a monaural beamformed ipsi input audio signal Ji. The monaurally beamformed ipsi input audio signal Ji may undergo further processing steps as indicated by the dotted line. The resulting audio signal is transformed back, in particular into time-domain, using the back transformation unit 25. The resulting output audio signal O is provided to the audio output unit 9.

FIG. 5 schematically depicts a further embodiment of audio signal processing on a hearing device 304. Devices, components, audio signals and other data, which have been described with respect to the embodiments in FIGS. 3 and 4, carry the same reference numbers and are not explained in detail again.

The hearing device 304 is part of a hearing system (not shown) comprising a further hearing device (not shown). The further hearing device is, with respect to hearing device 304, also referred to as contra hearing device or contra side.

The hearing device 304 only differs with respect to the audio processing unit 311 from the hearing device 204 shown in FIG. 4. The audio processing unit 311 comprises a monaural beamformer 24 which generates the monaurally beamformed ipsi input audio signal Ji. The monaurally beamformed ipsi input audio signal Ji is provided to an audio processing routine 318. The audio processing routine 318 is a beamformer post-filter. The audio processing routine 318 filters the monaurally beamformed ipsi input audio signal Ji. The audio processing routine 318 is steered by the level feature F. The level feature F comprises a noise floor estimate (NFE) and/or a signal-to-noise-ratio (SNR). Preferably, the level feature F is a noise floor estimate (NFE).

In further embodiments, which are not shown explicitly, features of the above-described embodiments may be combined. For example, the level feature F may be used to steer several audio processing routines. For example, the level feature may be used to steer a monaural beamformer for beamforming the ipsi input audio signal and to steer a subsequent binaural beamformer and/or a beamformer post-filter.

In further embodiments, secondary input audio signals may be provided from one or more peripheral devices. For example, secondary input audio signals may be provided from a mobile device, in particular a smartphone, and/or a wireless microphone. Providing secondary input audio signals from a peripheral device allows to take into account further information contained in the secondary input audio signal, in particular spatial information obtained by the different positioning of the one or more peripheral devices and/or from a beamformer comprised by the one or more second devices. Consequently, the determination of the level feature and the steering of the audio processing routine are less prone to asymmetric situations, leading to a more consistent and stable audio signal processing.

In the above-described embodiments, the level features F are determined by averaging level features obtained from primary input audio signals, in particular ipsi input audio signals, and secondary input audio signals, in particular contra input audio signals. In further embodiments, it may be possible to determine the level feature F based on a combined, in particular mixed, input audio signal. For example, averaging can also be performed on the input audio signals themselves.

Figure 6:
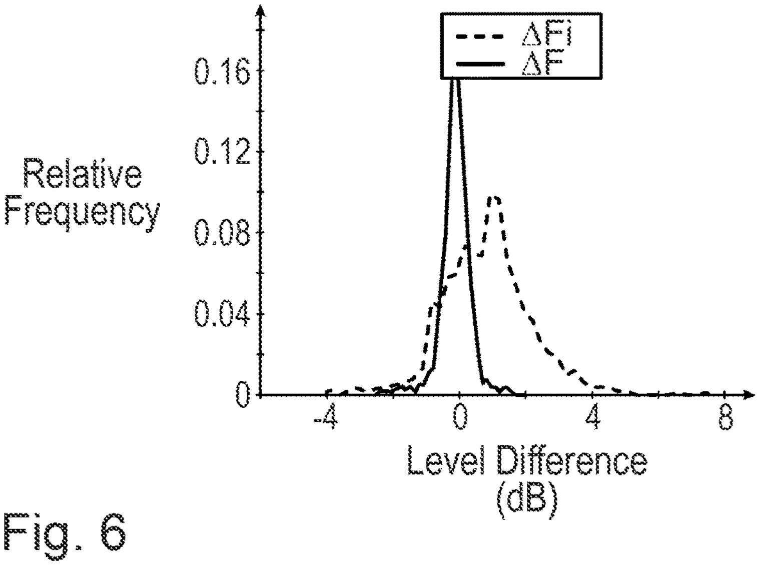
FIG. 6 to FIG. 8 show exemplary test data comparing level features, which are obtained solely on basis of the ipsi input signal, with level features obtained from ipsi and contra input signals.
Figure 7:
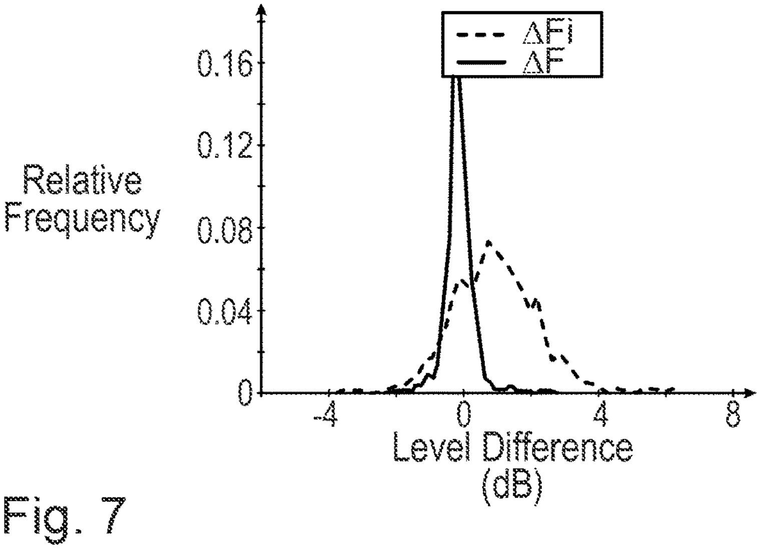
Figure 8:
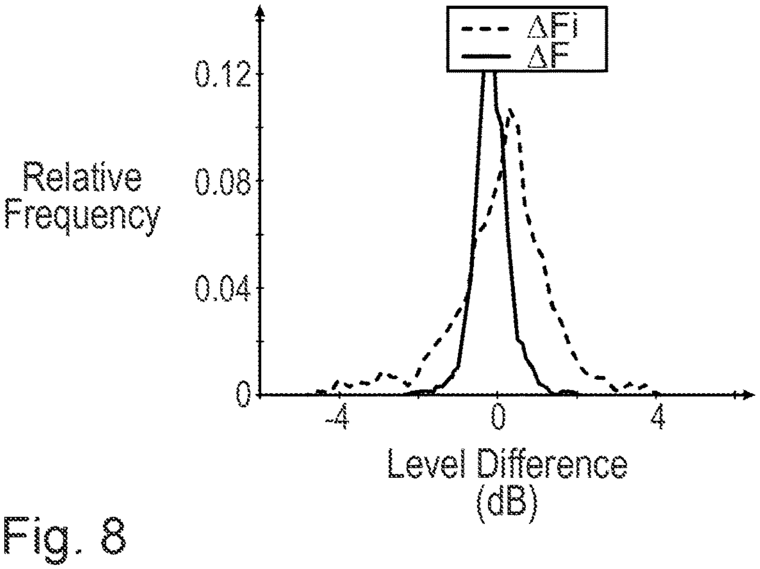

FIGS. 6 to 8 show exemplary plots of test data concerning different kinds of level features. The test data has been obtained in by recording a real acoustic scene. In a specific example, the recording comprises sounds of a cafeteria, traffic noise, conversation etc. Such sound scenes may naturally comprise sound sources, which are asymmetrically placed with respect to a recorder or hearing system (such as the sound source exemplarily shown in FIG. 1). In such a test environment, the sound produced by one or more of the sound sources may be more prominent in the ambient sound received by the hearing device closer to the sound source. Thus, the respective input audio signal and the level features derived therefrom differ, which may lead to asymmetric and inconsistent steering of audio processing routines.

FIGS. 6 to 8 show a difference of the level features, determined on the left and the right hearing device. FIG. 6 shows the level difference of the noise floor estimate (NFE). FIG. 7 shows the level difference in the sound pressure level (SPL). FIG. 8 shows the level difference in the signal-to-noise-ratio (SNR). The plots show the level feature difference ΔFi resulting from one-sided level features Fi, which are determined only based on the respective ipsi input audio signal. Further, the plots show the level feature difference ΔF, when the level feature is determined on the respective ipsi input audio signal and the received contra input audio signal. ΔFi is represented by dashed lines, while ΔF is shown with solid lines in FIGS. 6 to 8.

In the shown plots, ipsi input audio signal and contra input audio signal have different metrics. In particular, ipsi input audio signal and contra input audio signal which have been used to locally calculate level features on the respective hearing device, have the metrics described with respect to the embodiment shown in FIG. 3. That is the ipsi input audio signal is the audio signal received by the front microphone. The contra input audio signal is the beamformed input audio signal from the contra hearing device, which is transmitted with reduced bandwidth. The plots in FIGS. 6 to 8 show the relative frequency over the level difference in decibel. The broader the curve is, the more asymmetric the locally calculated level features are. Symmetric level features and with that symmetric steering are obtained by a distribution located around 0 dB. As can be seen from the plots 6 to 8, the respective level features become significantly more symmetric upon averaging the ipsi and contra input audio signals, thus resulting in a more symmetric and consistent steering of the at least one audio signal processing routine. This demonstrates that the inventive technology leads to a significant improvement in the audio signal processing without the need of transmitting further data and information, in particular level features, between different devices of a hearing system, in particular between different hearing devices of a hearing system.

The invention claimed is:

1. Method for audio signal processing on a hearing system, wherein the hearing system comprises a first device and a second device, wherein the first device is a hearing device, the method comprising the steps:

obtaining a primary input audio signal by an audio input unit of the first device, obtaining a secondary input audio signal using the second device, transmitting the secondary input audio signal from the second device to the first device, determining a level feature based on the primary input audio signal and the secondary input audio signal by a feature determination unit of the first device, obtaining an output audio signal from the primary input audio signal and/or the secondary input audio signal by applying at least one audio processing routine using an audio processing unit of the first device, wherein the level feature is used for steering the at least one audio processing routine, and outputting the output audio signal by an audio output unit of the first device, wherein determining the level feature comprises:

determining a primary level feature based on the primary input audio signal, determining a secondary level feature based on the secondary input audio signal, and averaging the primary level feature and the secondary level feature to obtain the level feature.

2. Method according to claim 1, wherein the second device is a further hearing device of the hearing system.

3. Method according to claim 1, wherein the primary input audio signal is transmitted from the first device to the second device for being used in audio signal processing on the second device.

4. Method according to claim 3, wherein the second device determines a level feature based on the transmitted primary input audio signal and the secondary input audio signal and wherein the second device uses the level feature for steering an audio processing routine of an audio processing unit of the second device.

5. Method according to claim 1, wherein the level feature comprises a noise floor estimate, a sound pressure level, a signal-to-noise-ratio and/or a low frequency level.

6. Method according to claim 1, wherein the at least one audio processing routine comprises a beamformer routine, in particular comprising binaural beamformer, a post-filter routine, in particular a beamformer post-filter, a speech enhancement routine, a classifier, a noise canceler and/or a wind noise canceler.

7. Method according to claim 1, wherein steering the audio processing routine determines a mixing ratio of the primary input audio signal and the secondary input audio signal used in the audio signal processing.

8. Method according to claim 1, wherein the transmitted secondary input audio signal is a beamformed audio signal.

9. Method according to claim 1, wherein the secondary input audio signal is transmitted with reduced bandwidth.

10. Hearing system, comprising a first device being a hearing device with an audio input unit for obtaining a primary input audio signal, and a second device, wherein the second device is configured for obtaining a secondary input audio signal and transmitting the secondary input audio signal to the first device, wherein the first device comprises;

a data interface for receiving the secondary input audio signal, a feature determination unit for determining a level feature based on the primary input audio signal and the secondary input audio signal, an audio processing unit for processing the primary input audio signal and/or the secondary input audio signal to obtain an output audio signal using at least one audio processing routine, and an audio output unit for outputting the output audio signal, wherein the audio processing unit is configured to use the level feature to steer the at least one audio processing routine, and wherein the feature determination unit is configured to determine the level feature by:

determining a primary level feature based on the primary input audio signal, determining a secondary level feature based on the secondary input audio signal, and averaging the primary level feature and the secondary level feature to obtain the level feature.

11. Hearing system according to claim 10, wherein the second device is a hearing device.

12. Hearing system according to claim 10, wherein the first device is configured to transmit the primary input audio signal to the second device, and wherein the second device is configured for audio signal processing using the transmitted primary input audio signal.

13. Hearing device, comprising an audio input unit for obtaining a primary input audio signal, a data interface for receiving a secondary input audio signal from another hearing device, a feature determination unit for determining a level feature based on the primary input audio signal and the secondary input audio signal, an audio processing unit for processing the primary input audio signal and/or the secondary input audio signal to obtain an output audio signal using at least one audio processing routine, and an audio output unit for outputting the output audio signal, wherein the audio processing unit is configured to use the level feature to steer the at least one audio processing routine, and wherein the feature determination unit is configured to determine the level feature by:

determining a primary level feature based on the primary input audio signal, determining a secondary level feature based on the secondary input audio signal, and averaging the primary level feature and the secondary level feature to obtain the level feature.

* * * * *